UNITED STATES PATENT OFFICE.

ROBERT SCHMIDLIN, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

BROWNISH-YELLOW WOOL DYESTUFFS AND PROCESS OF MAKING SAME.

1,162,109.  Specification of Letters Patent.  Patented Nov. 30, 1915.

No Drawing.   Application filed July 2, 1913.   Serial No. 777,100.

*To all whom it may concern:*

Be it known that I, ROBERT SCHMIDLIN, chemist, a citizen of the Republic of Switzerland, residing at Höchst-on-the-Main, Germany, have invented certain new and useful Improvements in Brownish-Yellow Wool Dyestuffs and Processes of Making Same, of which the following is a specification.

I have found that by causing 1-chloro-2.4-dinitrobenzene to act upon the aryloxy-or arylamino-diaminodiphenylamin-meta-sulfonic acids of the formula:

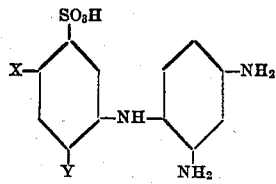

wherein X and Y indicate positions one of which is occupied by hydrogen and the other by the arylamino- or the aryloxy-residue, new bodies are obtained having the general formula—

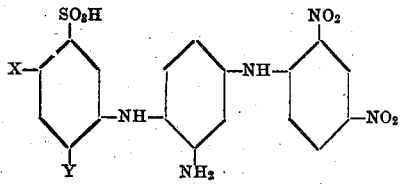

These new bodies constitute wool-dyestuffs of a brownish-yellow color, remarkable for their excellent fastness to washing and to the action of light and alkalis. By treating the dyeings with chrome-mordants, they become darker. Their sodium salts constitute brown to blackish-brown powders, difficultly soluble in cold water, readily soluble in hot water and alcohol, the free acid being precipitated from the aqueous solution by adding an acid.

The following examples illustrate my invention:

Example I: 37 parts by weight of para-phenoxydiaminodiphenylamin-meta-sulfonic acid are dissolved in 200 parts of water to which 11 parts of sodium carbonate have been added, and this solution is stirred for several hours on the water-bath with 20 parts of 1-chloro-2.4-dinitrobenzene. The sodium salt which separates is then dried.

Example II: 37 parts by weight of phenyl-aminodiaminodiphenylamin-m-sulfonic acid are dissolved in 200 parts of water to which 11 parts of sodium carbonate have been added, and this solution is stirred for several hours at 55-60° C. with 20 parts of 1-chloro-2.4-dinitrobenzene. The separated sodium salt is then dried. A body is thus obtained having the formula:—

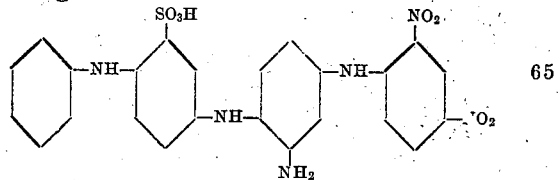

dyeing wool brownish-yellow tints remarkable for their excellent fastness to washing and to the action of light and alkalis, its sodium salt being a dark-brown powder which is difficultly soluble in cold water, readily soluble in hot water and alcohol.

Example III: 42 parts by weight of ortho-ẞ-naphthoxydiaminodiphenylamin-m-sulfonic acid are dissolved in 200 parts of water to which 11 parts of sodium carbonate have been added, and this solution is stirred for several hours on the water-bath with 20 parts of 1-chloro-2.4-dinitrobenzene. The sodium salt which separate is then dried.

Example IV: 42 parts by weight of ortho-ẞ-naphthylaminodiaminodiphenylamin-m-sulfonic acid, dissolved in 200 parts of water and 11 parts of sodium carbonate, are heated for several hours to 90-100° C., while stirring, with 20 parts of 1-chloro-2.4-dinitrobenzene. The sodium salt which separates is filtered off and dried.

Having now described my invention, what I claim is:

1. The process of manufacturing brownish-yellow wool-dyestuffs, which consists in causing 1-chloro-2.4-dinitrobenzene to act upon bodies containing the atomic grouping:—

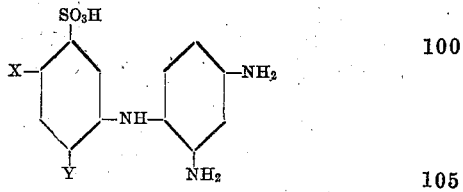

wherein X and Y indicate positions, one of which is occupied by hydrogen and the other by an aryl-containing residue.

2. As new articles of manufacture, the bodies containing the atomic grouping—

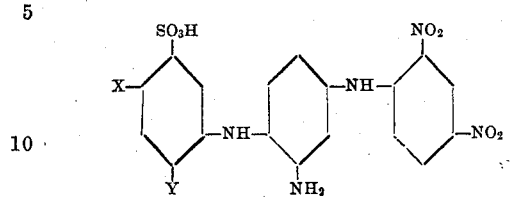

wherein X and Y indicate positions one of which is occupied by hydrogen and the other by an aryl-containing residue, and dyeing wool brownish-yellow tints remarkable for their excellent fastness to washing and to the action of light and alkalis, their sodium salts being brown to blackish-brown powders which are difficultly soluble in cold water, readily soluble in hot water and alcohol.

3. As a new article of manufacture, a body of the formula:

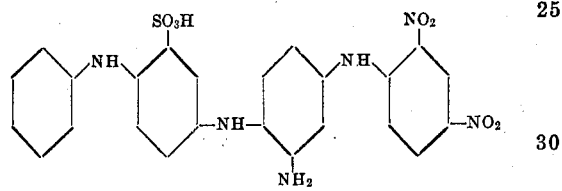

dyeing wool brownish-yellow tints remarkable for their excellent fastness to washing and to the action of light and alkalis, its sodium salt being a dark-brown powder which is difficultly soluble in cold water readily soluble in hot water and alcohol.

In testimony whereof, I affix my signature in presence of two witnesses.

ROBERT SCHMIDLIN.

Witnesses:
 JEAN GRUND,
 CARL GRUND.

Copies of this patent may be obtained for five cents each, by addressing the "Commissioner of Patents, Washington, D. C."